Oct. 20, 1970     C. MOLIN ET AL     3,534,463

METHOD OF JOINING TOGETHER CORRUGATED-CORE PANELS

Original Filed March 2, 1965     2 Sheets-Sheet 1

Inventors
Charles Molin
Marius Pincheval
By
Karl W. Flocks
Attorney

Oct. 20, 1970    C. MOLIN ET AL    3,534,463
METHOD OF JOINING TOGETHER CORRUGATED-CORE PANELS
Original Filed March 2, 1965    2 Sheets-Sheet 2
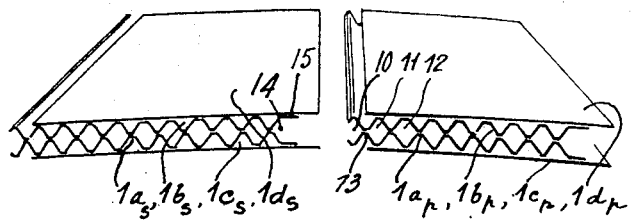
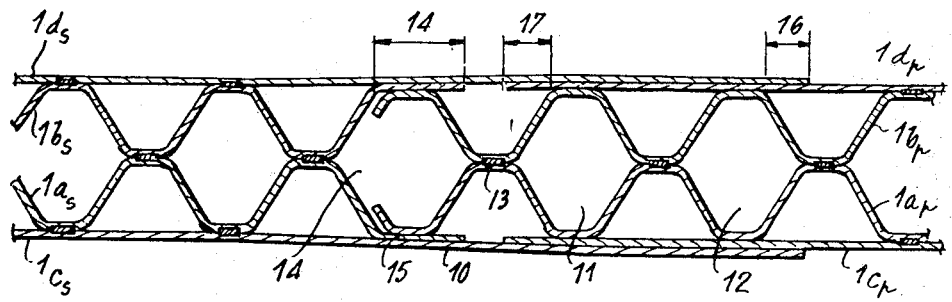
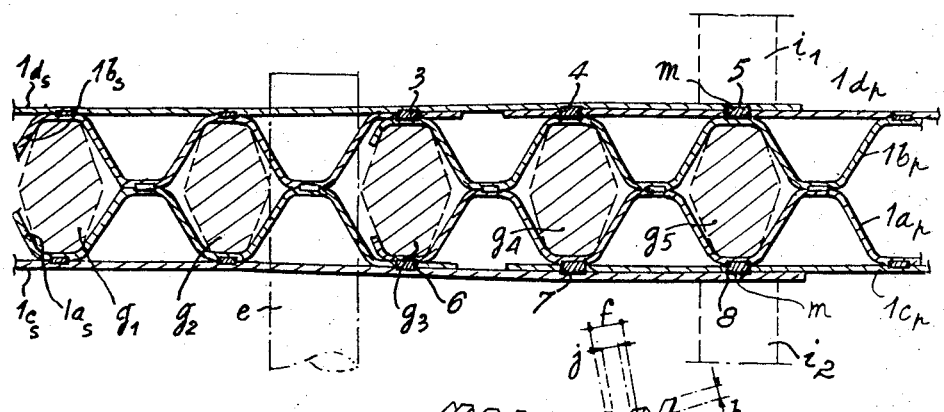
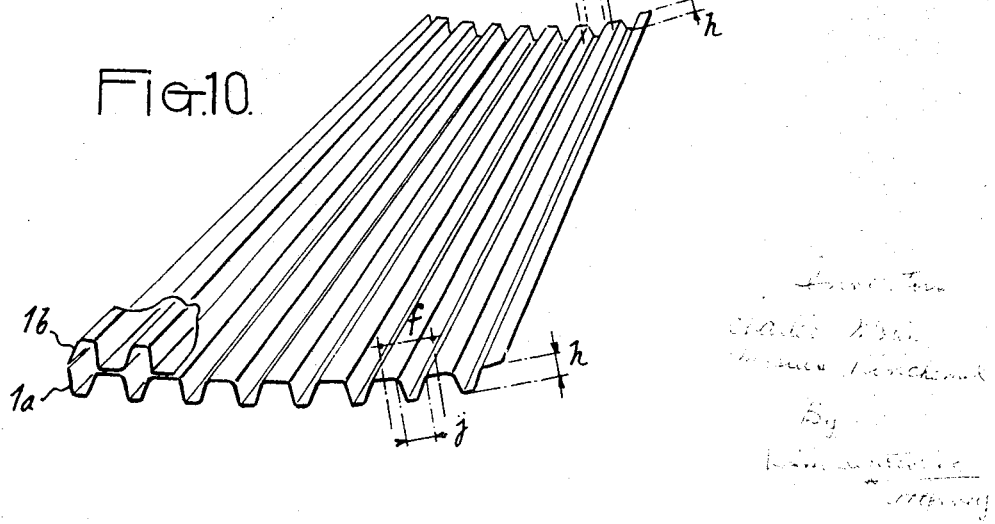

United States Patent Office 3,534,463
Patented Oct. 20, 1970

3,534,463
**METHOD OF JOINING TOGETHER
CORRUGATED-CORE PANELS**
Charles Molin, Chatenay-Malabry, and Marius Pinchemel, Paris, France, assignors to Nord-Aviation Societe Nationale de Constructions Aeronautiques, Paris, France, a joint-stock company of France
Continuation of application Ser. No. 436,616, Mar. 2, 1965. This application May 8, 1969, Ser. No. 823,191
Claims priority, application France, Mar. 25, 1964, 968,725
Int. Cl. B23k 31/02
U.S. Cl. 29—471.1   3 Claims

ABSTRACT OF THE DISCLOSURE

A method of joining together panels formed of corrugated sheets covered by smooth sheets, in the direction of their corrugations, with a fitting of one into the other of the lateral edges so that an incompletely closed wave of the corrugation fits into an open half wave, with the sheets overlapping.

---

This application is continuation of Ser. No. 436,616, now abandoned.

The present invention relates to a method of joining together panels with corrugated cores.

The corrugated core comprises a corrugated sheet, or two corrugated sheets assembled next to each other along the crests of their corrugations in contact with each other. The core is covered by a smooth sheet on one of its faces or on both faces to form the panel. The thickness of all the sheets used in the panel is generally very small and may be of the order of 0.1 mm.

Panels of this kind, more generally assembled by electric spot welding, are currently utilized in the aerospace industry.

The difficulties which are encountered in joining together such panels reside in the fact that the stresses that pass through the joint cannot, in most cases, be transmitted except by the external facing sheets; the discontinuity of the corrugated core preventing it from participating in the transmission of those stresses.

A method is known for joining together such panels, in which the panels are assembled end to end after their edges have undergone a special preparation subject to particular tolerances in respect to flatness and straightness. Such a preparation is possible only if the dimensions of the panels are so small that, once their edges have been prepared, they may be suitably placed without excessive play along the junction lines provided. If that method is applicable in certain cases, it will be appreciated that it cannot be suitable when a large number of panels are to be joined together. It will also be clear that that method entails considerable expense for the preparation of the elementary panels, expenses to be added to costs which are also considerable for the assembly of the panels to each other by reason of the precision necessary in placing them in position. The resulting production cost of these panels is prohibitive. Finally, the introduction of an essential inert gas into the welding zone in the interior and the exterior of the joint necessary in this method is frequently difficult to achieve.

The method according to the present invention has as an object the elimination of these disadvantages. The joining method of the present invention is applicable to the joining of corrugated core panels in the direction of their corrugations, where each corrugated core, comprising a continuous series of corrugations connected together by a portion known as an "interval" and comprising at their crests a portion known as a "plateau," is covered by a smooth metal sheet on at least one of its faces, the core and the facing sheets having a very small thickness and being connected together by lines of spot welding.

The method comprises preparing the lateral edges of each of the panels to be joined together in order that they can fit one into the other. The female element comprises an incompletely closed free half-wave, at least one free normal wave adjacent to the incompletely closed wave, and covering sheets free of the half-wave and adjacent full wave. The male element completes the fitting operation due to the fact that it comprises an incompletely closed wave which fits into the open half-wave of the female element, the sheets corresponding to the female element overlapping the two waves in engagement one on the other and the sheets of the male element immediately above at least one free adjacent normal wave of the female element terminating in such manner as never to be able to abut against the extended plateau of the open half-wave. The fitting permits a sliding movement of the two panels with respect to each other, the amplitude of which is a function of the length of the extended plateau of the open half-wave; in bringing together the two panels to be joined, they are caused to slide with respect to each other until they occupy the desired relative position both laterally and longitudinally. The assembly is then completed by at least two lines of spot welds, one directly above the plateau of the waves in engagement with each other, the other above the plateaux of the wave following the incompletely-closed wave on the side corresponding to the male portion of a panel.

According to an alternative method, the overlapping sheet extending the panel in the female element of the fitting is replaced by an added sheet and, the wave adjacent to the open half-wave having been left free, the added sheet is fixed by at least three lines of welding, the first corresponding to this free wave and two others being those of the normal interlocking fitting.

This method has the advantage of producing a sufficient overlap of the facing sheets of the two panels to be joined together, thus permitting the necessary number of welding points for good performance of the joint, while not destroying the continuity of the corrugated cores of the panels.

It also has the advantage of facilitating the placing in position of the panels with respect to each other by reason of the degree or degrees of freedom available, depending on the shape of the panels, permitting a slight sliding movement of adjacent panels, one with respect to the other.

Other particular features and advantages will be brought out from the following description of different ways of application of the method according to the invention, reference being made to the accompanying drawings, in which:

FIGS. 7, 8 and 9 show respectively the preparation of the facing edges of two panels to be joined together following the method of jointing shown in FIG. 3, their assembly and their lines of welding which join them.

FIG. 10 is a diagram showing, with parts broken away, the corrugated core of the type shown in FIG. 3, corresponding to a panel used for the construction of a frusto-conical unit.

All the embodiments thus shown and described below relate to interlocking joints in which the male element originally comprises an incompletely-closed wave and two free normal waves with respect to the covering sheets, an arrangement which is preferred.

Figure 1:
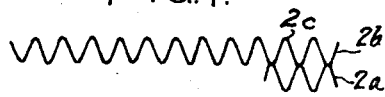
FIGS. 1 and 2 are diagrams representing respectively a form of corrugation of the sheets constituting the corrugated core and their method of assembly.
Figure 2:
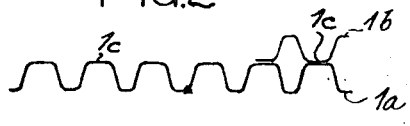

In FIGS. 1 and 2, the corrugated cores are constituted by the corrugated sheets $2a$ and $2b$ in one case and by the corrugated sheets $1a$ and $1b$ for the other. The wave of sheets $2a$ and $2b$ of FIG. 1 are less flattened (with a shorter plateau $2c$) than that of FIG. 2. Similarly, the interval separating two adjacent waves is also shorter. The plateaux $1c$ of the sheets $1a$ and $1b$ are relatively long.

Generally speaking, the same references are utilized in all the figures to designate the same elements, the index $p$ being added in the case of an element of the first panel of an assembly and the index $s$ for the case of an element of the second panel of the same assembly.

Figure 3:
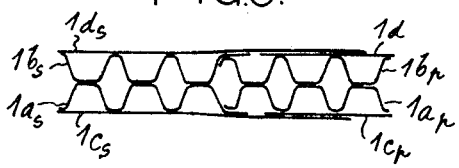
FIGS. 3, 4, 5 and 6 are respectively diagrams showing types of joints according to the invention of two panels, the corrugated cores of which are the same as that shown in FIG. 2.

In FIG. 3, a male panel comprising a core with two corrugated sheets $1ap$ and $1bp$ and two flat covering sheets $1cp$ and $1dp$ is joined to a female panel also comprising a core with two corrugated sheets, $1as$ and $1bs$ and two overlapping sheets $1cs$ and $1ds$.

Figure 5:
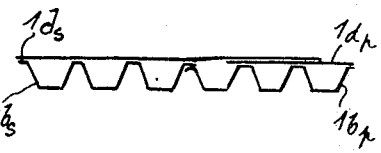
Figure 4:
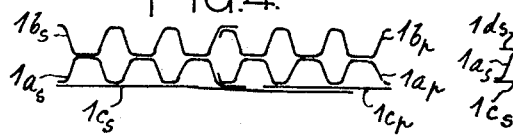
Figure 6:
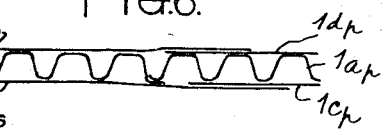

FIG. 4 shows the joining of two panels, each comprising a core with two corrugated sheets, the waves being parallel to each other, and a single covering sheet for each panel. FIG. 5 shows the joining of two panels each comprising a core with a single corrugated sheet and a single flat covering sheet and FIG. 6 shows the joining of two panels each comprising a single corrugated sheet and two covering sheets.

It should be noted that the corrugated sheets employed in the panels of FIGS. 3 to 6 are of the type shown in FIG. 2, namely with large plateaux $1c$ and wide intervals.

The joint according to the invention, coupling together two panels with corrugated cores shown diagrammatically in FIG. 3 will now be described in detail for the case in which the panels are rectangular, by reference to FIGS. 7 to 9 which show the joint at the three stages of its production: preparation of the edges of the panels in FIG. 7, assembly in FIG. 8 and welding in FIG. 9.

The lateral edges facing each other on the panels to be joined together are prepared in the following manner:

One of these edges comprises a free, but incompletely-closed wave 10, the two adjacent waves 11 and 12 being also free, that is not yet welded to the covering sheets $1dp$ and $1cp$, and the two covering sheets terminating approximately above the interval 13 separating the free open wave 10 and the adjacent wave 11. This assembly corresponds to the male part of the fitting. The other edge or female portion comprises a free open half-wave 14, the plateau 15 of which is approximately double that of the plateau of a normal wave, the two covering sheets $1ds$ and $1cs$ extending so as to be able to overlap the open free wave 10 and the two free waves 11 and 12 when the fitting is completed.

In the assembly phase shown in FIG. 8, a relative sliding movement with two degrees of freedom of the two parts of the fitting both in towards each other and perpendicular to said first direction, with movement of one part relative to the other part, is possible within a limit which is a function of the length of extension of the plateau 15 of the open half-wave 14, it being understood that the length of the overlap 16 of the covering sheet $1ds$ beyond the plateau of the free wave 12 and that of the overlap 17 in the opposite direction of the covering sheet beyond the plateau of the free wave 11 are compatible with that of the extended plateau 15.

The two degrees of freedom of the fitting thus obtained are utilized in order to place the two panels in position one with respect to the other, before welding within the limits which have just been defined. Thus, they may or may not be arranged with edges in line with each other, as preferred.

The two panels are then welded together by effecting the lines of welding along lines 3, 4, 5, 6, 7 and 8. The welding wheels $i_1$ and $i_2$ of the welding machine utilized for this purpose are shown diagrammatically in dotted lines in FIG. 9. Mandrels $g_1$, $g_2$ . . . are passed into the corrugations so as to prevent the flattening of the panel by the pressure of the wheels and to permit the passage of the current. The position of the panels with respect to each other can be maintained by permitting the extremities of the mandrels $g_1$, $g_2$ . . . to extend beyond the edges of the panels and by introducing between them the teats $e$.

If now it is assumed that FIGS. 7, 8 and 9 represent respectively, not rectangular panels but trapezoidal panels, in which, as in FIG. 10, the height $h$ of the waves is constant as is also their width $j$ at the base, the distance $f$ between the points located at the centre of the intervals of two adjacent waves only varying when moving from one of the bases of the panel towards the other, it is obvious that these two panels can be assembled together as if they were rectangular. The fitting also has two degrees of freedom.

FIG. 10 shows a curved corrugated core with two corrugated sheets, in which either of its faces or both its faces can be provided with a smooth covering sheet for its corrugated sheets $1a$ and $1b$. A panel of this kind constitutes an element of the outer surface of a frustum of a cone of revolution, limited laterally by its lines of intersection with two planes passing through the said axis of revolution. The height $h$ of the waves and their width $j$ are constant; on the other hand, the distance $f$ between the centre of the plateau of one wave and the centre of the adjacent wave diminishes as and when the distance to the small side of the corrugated core becomes less.

It is quite clear that if the lateral edges of panels formed with corrugated cores similar to that of FIG. 10 are prepared in accordance with the present method, it will be possible to fit the male edge of one panel into the female edge of the adjacent panel, and this fitting will permit a sliding movement of one panel with respect to the other within the same limits as in FIG. 8, that is to say according to the value of the element equivalent to the plateau 15. Once the two panels have been placed with respect to each other, the welding lines can be effected.

Figure 13:
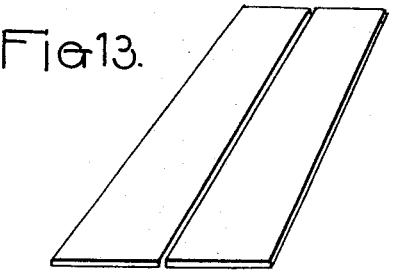
FIGS. 13, 14, 15 and 16 are diagrams showing the different possible forms of panels with corrugated cores which can respectively be joined to each other in pairs.
Figure 14:
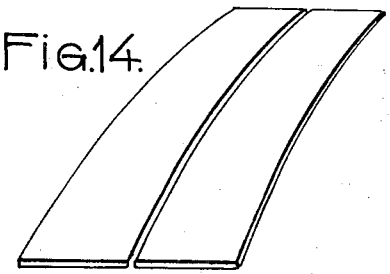
Figure 15:
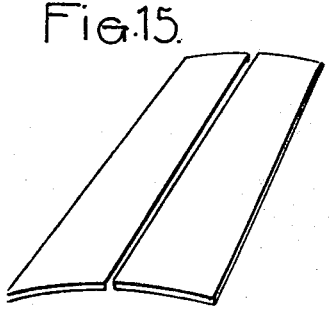
Figure 16:
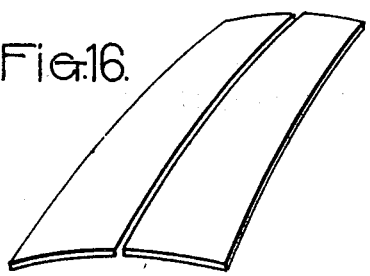

FIGS. 13 to 16 show diagrammatically all the different types of panels to which the present method of jointing is applicable, not forgetting, however, that the height $h$ and the width $j$ of the waves are invariable in each of the panels to be assembled together and that the only variable from one base of the panel to the other is the distance $f$ between the centre points of two adjacent plateaux. FIG. 13 represents two flat rectangular or trapezoidal panels, FIG. 14 two panels similar to those preceding but cambered or dished, FIG. 15 two cylindrical or frusto-conical panels in which the corrugated cores are similar, as regards the frusto-conical panel, to that shown in FIG. 10, and FIG. 16 two panel similar to those of FIG. 15, but dished.

In order to take account of all the cases to which the present invention is applicable, it must not be forgotten that each of the panels shown in FIGS. 13 to 17 may comprise one or two covering sheets, and its corrugated core may in turn comprise either one or two corrugated sheets.

It should be observed that if the covered faces of the panels to be joined together are not flat, the interlocking fitting has only one degree of freedom. In other words, the prepared edges can only slide one with respect to the other in one given direction, but they cannot pivot slightly with respect to each other about a common point as would ordinarily be allowable movement with curved surfaces, except within the limits of the tolerances of construction of the panels. It should, however, be stated that the covered faces forming part of a single sphere is an exception to this rule.

Figure 11:
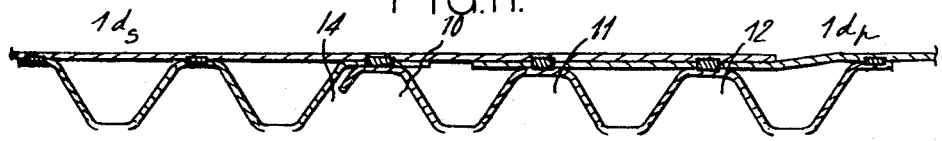
FIG. 11 shows a joint without added thickness of two panels according to FIG. 5.

It is always possible, as shown in FIG. 11, to obtain by mechanical rolling after welding a shrinkage of the portion of the overlapping sheet 1ds substantially above the incompletely-open wave 10 fitted in the open half-wave 14, and the two waves 11 and 12 so that by swaging the sheet 1dp, no extra thickness appears with respect to the two panels joined together.

Figure 12:
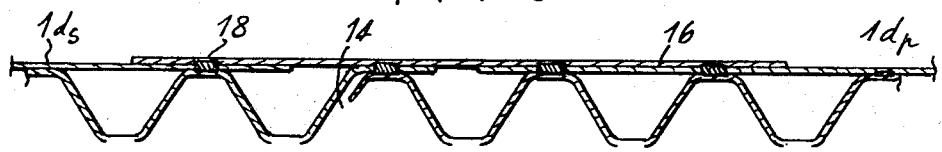
FIG. 12 represents a junction of two panels in accordance with FIG. 5, obtained by wedging.

Similarly, as shown in FIG. 12, the covering sheet 1ds may be stopped before the open half-wave 14 and a bonding sheet 16 substituted as an extension of the covering sheet, the added sheet being welded like the said extension, but also being welded immediately above the wave preceding the open-half-wave at 18.

The method according to the invention provides an economic and simple means in its application for ensuring the strong and accurate jointing of identical panels with corrugated cores. This method is applied to panels of different constitutions and varied shapes, and it is possible to obtain varied assemblies of large size. Thus, it is possible to join together 32 elementary panels of the type shown in FIG. 15, in which the tolerances concerning their dimensions are normal, in order to produce a very accurate closed frusto conical structure of stainless steel, having a large diameter of about 3 metres, a small diameter of about 2 metres and a height of about 1.80 metres.

It will of course be understood that the methods of application above have only been described by way of explanation and not in any limitative sense and that it is possible to carry out modifications of detail without thereby departing from the scope of the invention.

What is claimed is:

1. A method of joining smooth covered panels having weldable covers and corrugated cores, with the corrugations parallel to the connecting edges of said panels, permitting integral transmission of transversal and bending stresses passing through the points at which the panels are joined, which comprises:

overlapping of the smooth covers of the panels and overlapping of the cores as well as a zone where the core is provisionally not secured to the cover, longitudinal sliding of said cores and covers of the panels directly toward each other into interlocking position with adjustment to two degrees of freedom both toward each other and relatively adjacent to each other in a direction perpendicular to said movement toward each other, and welding of the cores and covers where covers or cores of one panel overlap cores or covers of the other of said panels.

2. A method of joining smooth covered panels having weldable covers and corrugated cores, with the corrugations parallel to the connecting edges of said panels, permitting integral transmission of transversal and bending stresses passing through the points at which the panels are joined, which comprises:

overlapping of the cores in a zone where the cores are provisionally not secured to the covers, longitudinal sliding of said cores and covers of the panels directly toward each other into interlocking position with adjustment to two degrees of freedom both toward each other and relatively adjacent to each other in a direction perpendicular to said movement toward each other, placing of a joining strip over and connecting said covers of each of said panels of the overlapping cores, and welding of the cores and covers where covers or cores of one panel overlap cores or covers of the other of said panels and said joining strip.

3. A method of joining smooth non-planar, covered panels having weldable covers and corrugated cores, with the corrugations parallel to the connecting edges of said panels, permitting integral transmission of transversal and bending stresses passing through the point at which the panels are joined, which comprises:

overlapping of the smooth non-planar covers of the panels and overlapping of the cores as well as a zone where the core is provisionally not secured to the cover, longitudinal sliding of said cores and covers of the panels directly toward each other into interlocking position with adjustment to one degree of freedom toward each other, and welding of the cores and covers where covers or cores of one panel overlap cores or covers of the other of said panels.

References Cited

UNITED STATES PATENTS

| 2,302,949 | 11/1942 | Palmer | 52—394 X |
| 2,576,530 | 11/1951 | Medal | 52—618 X |

FOREIGN PATENTS

| 416,840 | 9/1934 | Great Britain. |
| 839,250 | 6/1960 | Great Britain. |

CHARLIE T. MOON, Primary Examiner

U.S. Cl. X.R.

52—394, 618; 287—189.36